Patented Jan. 2, 1951

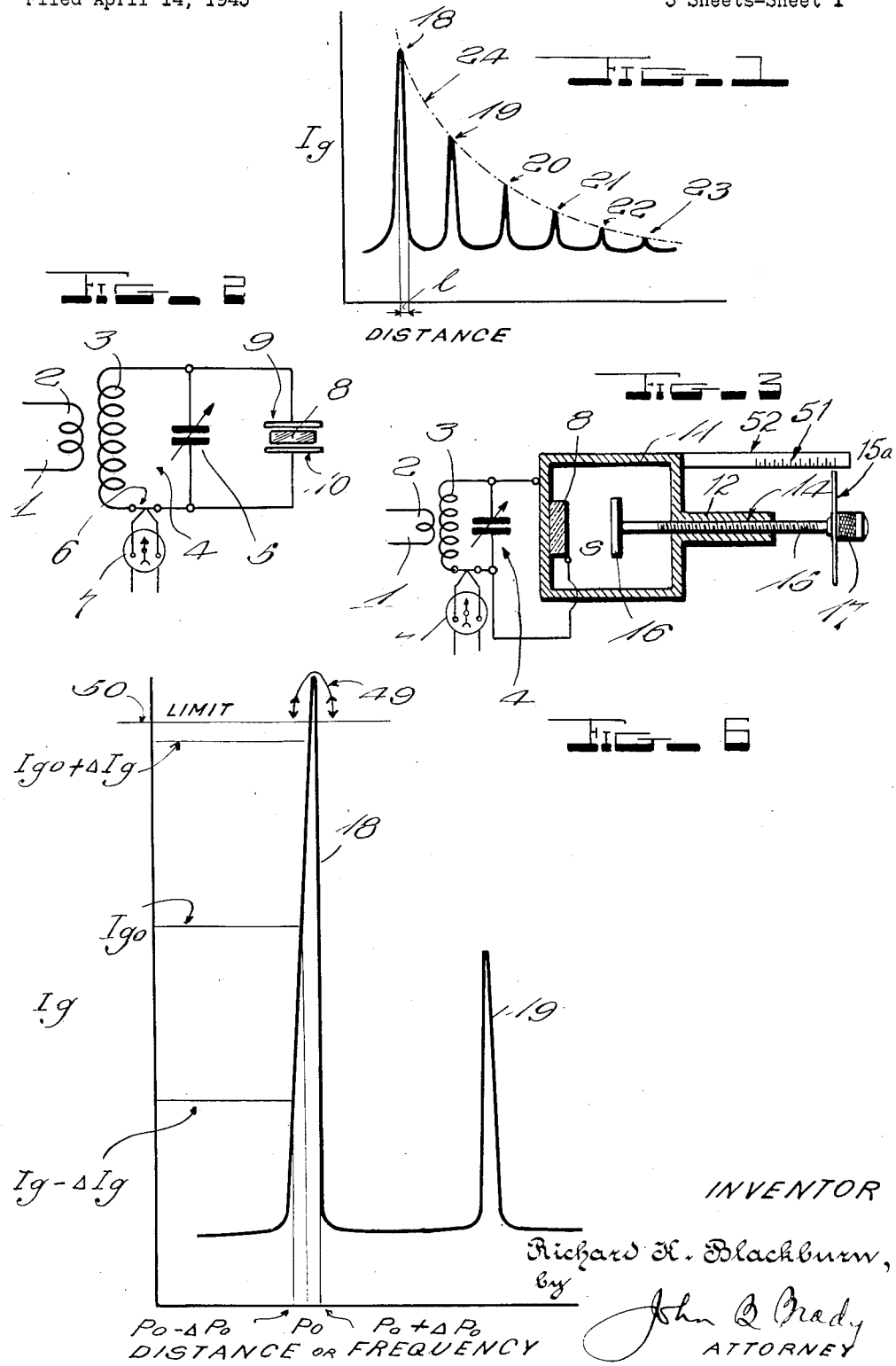

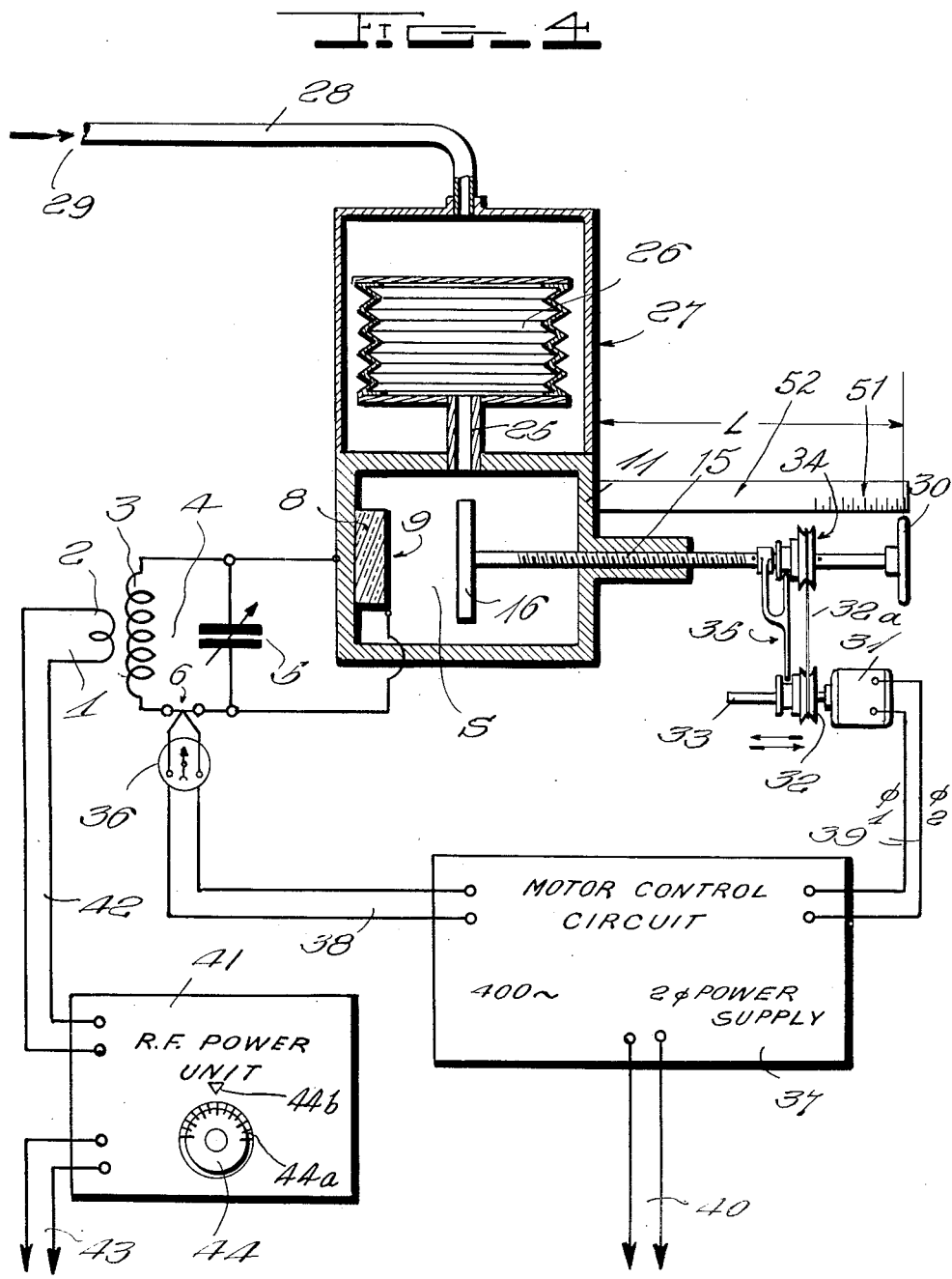

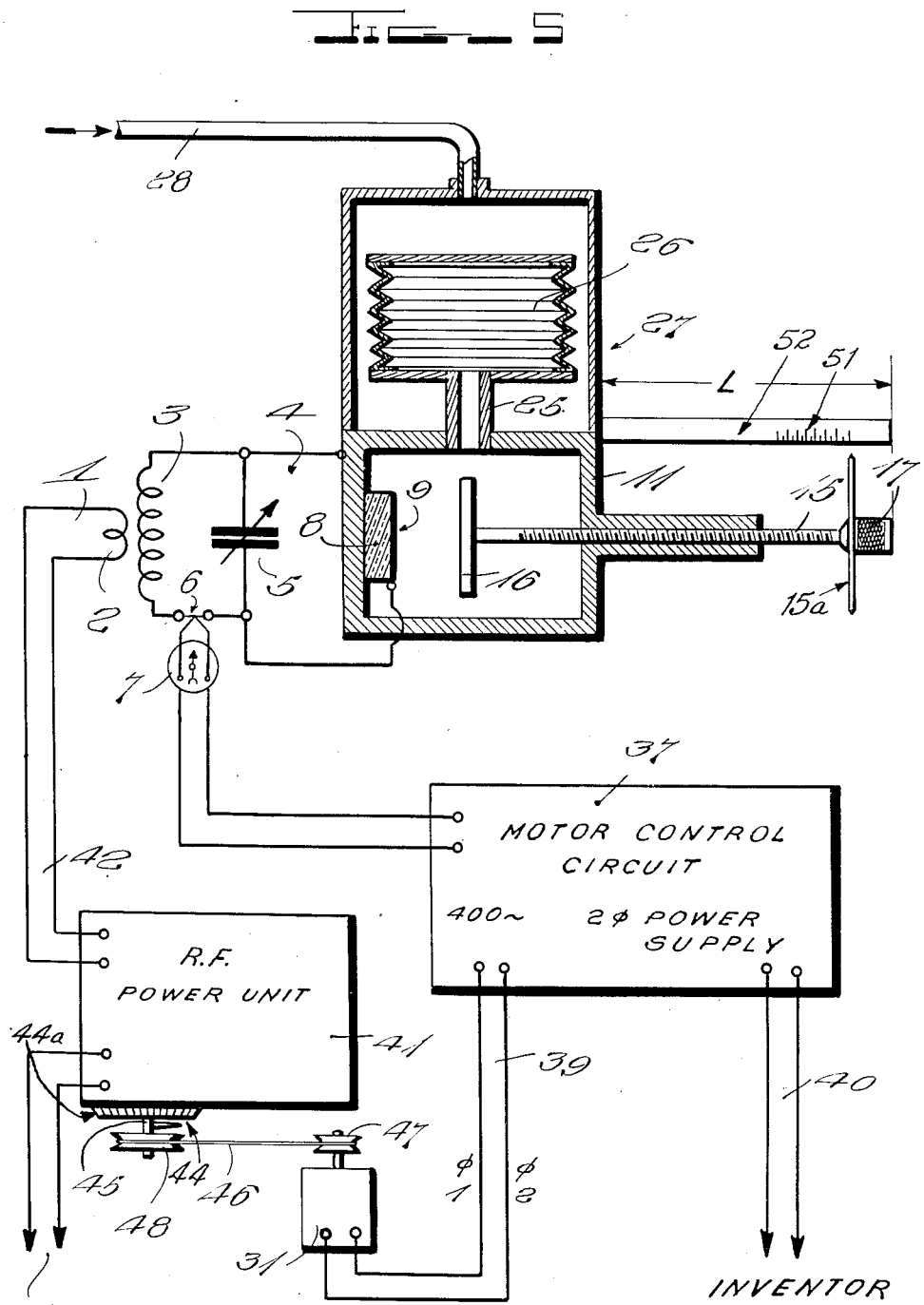

2,536,025

UNITED STATES PATENT OFFICE 2,536,025

PIEZOELECTRIC INTERFEROMETER SYSTEM

Richard K. Blackburn, East Hartford, Conn., assignor to Crystal Research Laboratories, Incorporated, Hartford, Conn., a corporation of Connecticut Application April 14, 1945, Serial No. 588,314

3 Claims. (Cl. 177—351)

My invention relates broadly to electronic systems and more particularly to an interferometer method and apparatus for effecting precision measurements of pressure, temperature or chemistry, etc.

One of the objects of my invention is to provide a system having high precision characteristics for electronically measuring altitude, velocity, pressure, temperature, chemistry and other properties and providing a visual indication of great accuracy.

Another object of my invention is to provide a simplified method for directly measuring by electronic means conditions of altitude, velocity, pressure, temperature, chemistry, etc., with high precision.

A still further object of my invention is to provide a novel apparatus for effecting by interferometer means a precise determination of altitude, velocity, pressure, temperature, chemistry or other properties.

A still further object of my invention is to provide a piezoelectric apparatus which may be adjusted through micrometer means for measuring the effects of supersonic frequencies as compared to pressure proportional to conditions of altitude, velocity, temperature or chemistry, etc.

Still another object of my invention resides in the arrangement of a supersonic interferometer system for measuring variable conditions generally and which includes a piezoelectric crystal generator of oscillatory currents which operates in a chamber subject to the variable conditions and which may be electrically connected for visually indicating properties of the variable with high precision.

Other and further objects of my invention reside in the arrangement of high precision electronically controlled measuring apparatus as set forth more fully in the specification hereinafter following by reference to the accompanying drawings in which:

Figure 1 is a curve diagram showing a typical measurement obtained by use of the interferometer system of my invention; Fig. 2 schematically illustrates a circuit diagram showing the connection of the piezoelectric crystal in the circuit of the interferometer; Fig. 3 is a schematic diagram showing in transverse section the arrangement of piezoelectric crystal apparatus and associated adjusting means employed in the system of my invention; Fig. 4 is a schematic and block diagram of the system of my invention applied to a fixed frequency variable path supersonic interferometer system for measuring the pressure of a gas; Fig. 5 is a schematic diagram illustrating my invention applied to a fixed path variable frequency supersonic interferometer system for measuring the pressure of a gas; and Fig. 6 is an enlarged curve diagram illustrating the manner in which the electronic system of my invention effects a hunting about a peak of the characteristic curve for accurately indicating differential changes in the variable under consideration.

My invention is directed to electronic means of employing the resonant peaks or valleys in a supersonic (or ultrasonic) interferometer as a device for measuring pressure, temperature or chemistry. The method and apparatus of my invention can specifically be employed for such uses as measuring altitude, velocity, or pressure at any point in an airplane or water-ship. It can also be used as a thermostat to control temperature within .001° C. or as a thermometer to measure larger changes. The apparatus of the invention can further be used to measure the chemistry of any substance that can be volatilized or liquified. It can be used to identify very minute changes in chemical composition in a heat of steel, for example.

The apparatus of the invention can be used to measure pressure, temperature, and chemistry, or any combination of the above three properties. It can be used to meter and regulate the flow of fluids in pipes. It can be used as a mixing control valve for fractionating, distilling, or other mixing operations where one or several fluids are involved and it is important to maintain a degree of accuracy in regard to pressure, temperature, or chemistry. The apparatus of my invention can, by introducing a gaseous or liquid sample of any product under investigation, determine its chemistry, pressure or temperature, or any combination thereof.

The nature of the apparatus of my invention is such that it can measure quantities both minute and large. For example, it can measure as little as a .0001° C. change in temperature, or can be used to measure temperature through any wanted number of degrees. Similarly, it can measure pressures of any sort capable of being produced, either in small or large gradients. Again, it can be employed to indicate a very minute change in the amount of one element in a heat of steel, and can also be so arranged to show that there is a large variation in the chemistry of the material under investigation.

There are many industrial and scientific applications where it is necessary to control or be aware of changes in pressure, temperature or chemistry of the order of magnitude (or larger) capable of detection with this invention, and this invention is intended to cover all such uses where the principle of employing a supersonic interferometer with electronic or mechanical controls is used to ascertain these changes.

This invention essentially consists of a supersonic interferometer containing a fluid filled chamber in which a plane parallel source is generated, a supersonic wave, which is propagated to and reflected from a plane parallel reflector. The wave is generated by a piezoelectric crystal in a tuned circuit, and the detection of the reflected wave is accomplished by this same crystal. This interferometer is so arranged that either the distance of the reflector from the source can be varied, or else the frequency of the signal can be varied so that resonance of the vibrations in the chamber can be maintained or destroyed. The electronic or mechanical controls can be so arranged, by varying the reflecting distance or the frequency, as to maintain or destroy this condition of resonance, or to create new conditions to accommodate changes in pressure, temperature, or chemistry. Very minute changes in pressure, temperature or chemistry will similarly change the resonant condition of these waves, and by measuring the variations in reflecting distance or in frequency, an indication of a change in pressure, temperature or chemistry will be afforded.

The electronic controls used to accomplish the objects hereinbefore set forth are shown in detail in the drawings.

Referring to Fig. 1, I have shown a curve diagram illustrating the character of indication which is given by the apparatus of my invention where the ordinates represent values of current X.

With the piston 16 set very near the crystal 8, the radiofrequency power source 1 is adjusted to the desired frequency, and the condenser 5 varied to produce the maximum value of $I_g$ as read on galvanometer 7. If now the piston 16 is moved slowly away from the crystal 8 the value of $I_g$ will change with successive positions of the piston 16. A plot of values of $I_g$ as ordinates against the associated piston position in distance from the crystal surface as abscissa will result in a graph similar to the one shown in Fig. 1. The distance of the piston from the crystal is indicated by the displacement of pointer 15a with respect to calibrations 51 carried by the scale 52 adjacent the micrometer screw 15 as shown in Fig. 3.

Now if the pressure, temperature, volume, or kind of fluid, contained in the region S within the gas tight chamber of metal box 11 between the piston 16 and crystal 8, is changed, the distance from the crystal 8 to the first peak 18 of $I_g1$ shown in Fig. 1, and the distance between successive peaks 19, 20, 21, 22, 23 will change. It is true also that the relative heights of the successive peaks will change according to an exponential curve indicated at 24 ($I_g$) and the abscissa represent increments of distance 1 permitting a precise determination of the distance from the crystal surface to the piston surface in the apparatus schematically shown in Fig. 3. The successive peaks of the curve illustrating current surges diminish in amplitude according to an exponential law.

Fig. 2 is a schematic diagram showing the principles employed in the system of my invention and a typical electrical connection for the piezoelectric interferometer crystal employed in the circuit of my invention. Reference character 1 indicates a circuit leading from a source of radiofrequency power such as a high frequency oscillator terminating in an inductance 2 which is electrically coupled with inductance 3 of the piezoelectric crystal circuit designated at 4. A piezoelectric crystal circuit 4 contains a tuning condenser 5 connected across inductance 3 through the thermo couple element 6 of the galvanometer 7. The piezoelectric crystal element is represented at 8 connected through plated electrodes 9 and 10 with the oscillation circuit 4. The crystal element 8 is an X-cut interferometer crystal.

The crystal 8 is mounted within the gas tight chamber or metal box which I have schematically shown in Fig. 3 at 11. The gas tight chamber or metal box 11 is schematically represented as having the X-cut interferometer crystal 8 supported adjacent one wall thereof so that vibrations from the crystal are directed into the region within the gas tight chamber or metal box 11. In the opposite wall of the gas tight chamber or metal box 11, I arrange the tubular extension 12 which is internally screw-threaded as represented at 14 to receive the micrometer screw 15. Micrometer screw 15 carries piston 16 on one end thereof which may be advanced towards or retracted from the piezoelectric crystal 8 within the region inside the gas tight chamber or metal box 11. The mechanism for controlling the micrometer screw 15 is represented generally at 17 whereby extremely minute and precise movements may be imparted to piston 16 with respect to the piezoelectric crystal 8 and the plated electrode 9 thereof. The distance between piston 16 and the piezoelectric crystal 8 is indicated by the relative position of pointer 15a over the calibrations indicated at 51 on the scale 52.

The unit described is employed in various mechanical and electrical combinations as represented, for example, in Fig. 4 as a fixed frequency variable path unit for a supersonic interferometer system for measuring pressure of a gas or in Fig. 5 as a supersonic interferometer system as a fixed path variable frequency unit in a supersonic interfermeter system for measuring the pressure of a gas.

Circuit 4 including piezoelectric crystal 8 oscillates at a supersonic frequency.

The peaks of the characteristic curves 19, 20, 21, 22, and 23 are extremely sharp in shape. This sharpness allows precise determination of the distance from the crystal surface defined by plated electrode 9 to the piston surface.

If a mechanical or electro-mechanical system is so arranged that the piston 16 always stayed at the top of the first peak 18 of the characteristic curve, then the relation between a given point on the piston rod or micrometer screw 15 and a fixed point such as the relative position of pointer 15a and calibrations 51 on scale 52, would be a direct measure of the changes taking place in the region S. This simple relation will not separate various changes, and it is, therefore, necessary that the changes be reduced to a single change by keeping all factors constant except the one desired variable.

Due to the nature of the system, it is absolutely essential that the crystal surface defined by plated electrode 9 and the piston surface 16 be perfectly plane and highly polished. It is also essential that the two surfaces be parallel at all times.

These essential limitations give rise to two possible methods of operation of the interferometer for the purposes outlined. One is a carefully made unit to obey the demands set out hereinbefore; namely, plane surfaces always parallel, while the piston 16 is advanced or retracted by an electro-mechanical system. The other is the use of a reflector piston which is fixed relative to the crystal surface. This second type operates by having the frequency of the driving radiofrequency power changed so that the distance between the crystal and piston is always a half wavelength.

I have termed these two systems as (1) "The fixed frequency-variable path interferometer" and (2) "The variable frequency-fixed path interferometer." In the latter case, the electromechanical system varies the oscillator frequency to keep the galvanometer current $I_g$ at a maximum value.

These two systems are two solutions to the equation velocity equals wavelength times frequency. In the first case as velocity changes with the desired variable, wavelength changes are discovered by moving the piston 16; while in the second case with the wavelength fixed, frequency must change to accommodate the changes in velocity.

Fig. 4 shows a block diagram of the "fixed frequency variable path interferometer" system for measuring changes in the pressure of a gas. The system would be similar for other quantities; a gas has been chosen for convenience in illustrating a complete diagram.

The gas tight chamber or metal box 11 has been illustrated as having a connection 25 at one side thereof leading to a spring bellows 26 housed within the gas tight box 27. A pipe line 28 connects to the gas tight box 27 and allows gas under pressure to be introduced at the position 29. Thus the spring bellows 26 is subject to expansion or contraction under action of the gas pressure introduced at 29 for correspondingly producing compression or rarefaction of the gas within region S within the gas tight chamber or metal box 11. The piezoelectric crystal element 8 is mounted as in Fig. 3 adjacent one wall of the gas tight chamber or metal box 11 with plated electrode surface 9 thereof presented towards the piston 16 which is movable under micrometer adjustment through micrometer screw 15. The gas within the gas tight chamber or metal box 11 may be hydrogen or carbon dioxide or other suitable gas. The micrometer screw 15 is adjusted through a distance L which changes with changes in pressure for changing the spacial relation of piston 16 with respect to plated electrode 9 of piezoelectric crystal 8. The hand wheel 30 may be adjusted to provide coarse adjustment of piston 16 while automatic and fine adjustment is effected through reversible motor 31 having drive pulley 32 on the motor shaft 33 belted to pulley 34 on micrometer screw 15. The position of piston 16 with respect to crystal 8 may be determined by noting the relative position of hand wheel 30 with respect to calibrations 51 on scale 52. Suitable drive means 35 is provided interconnecting the pulleys 32 and 34 to allow the pulleys to advance or retract along the extended shaft 33 of motor 31 and with respect to the movement of micrometer screw 15. That is to say, motor shaft 33 is sufficiently extended to allow pulley 32 to slide longitudinally while the pulley 32 continues to drive pulley 34 through the interconnecting belt 32a. The length of the shaft 33 depends upon the overall distance L through which piston 16 is advanced or retracted. Pulley 32 is suitably keyed to shaft 33 so that pulley 32 is positively driven by rotation of motor 31. Various types of motors may be employed but I have found the Kollsman two phase drag cup motor of 400 cycles well suited for this application. A differential control circuit for the control of the motor according to activation of thermocouple 36 in the piezoelectric crystal circuit 4 is connected to the motor control circuit unit and 400 cycle two phase power supply system 37 to leads represented at 38. The motor control circuit unit and two phase power supply system comprises a standard equipment of the type, for example, represented in the standard Kollsman two phase drag cup motor unit generally available on the market and motor control reverse means as represented, for example, in Mirick Patent 1,915,328 of June 27, 1933. The motor 31 is represented as connected through leads 39 to the motor control circuit unit 37. Two control phases are represented for purposes of explanation at $\phi_1$ and $\phi_2$ supplied to motor 31. The motor control circuit unit and two phase power supply is represented as supplied with power from a standard 110 volt 60 cycle power supply source through leads 40.

The oscillator circuit 4 is represented as being supplied with radiofrequency power from the radiofrequency power unit 41 connected through leads 42 to the coupling coil 1 which is coupled with an inductance 3 of the piezoelectric crystal circuit 4. Power for energizing the circuits of the radiofrequency power unit 41 is supplied through connections indicated at 43. The frequency adjustment means for the radiofrequency power unit is represented at 44 including a calibrated scale 44a having graduations indicating frequency coacting with a fixed reference marker 44b. In lieu of the fixed frequency variable path unit of Fig. 4, I may arrange the equipment for operation as heretofore explained, as a fixed path variable frequency unit.

Fig. 5 shows a block diagram of the "fixed path variable frequency interferometer" system for a similar application.

In this arrangement the Kollsman two phase 400 cycle drag cup motor 31, instead of being mechanically coupled to the piston adjusting means 16, is belted to the frequency control shaft 45 of the radiofrequency power unit as represented by belt 46 interconnecting drive pulley 47 with pulley 48 arranged to control the frequency adjustment means 44 of the radiofrequency power unit 41 associated with the calibrated scale 44a calibrated in terms of frequency. Changes in the effective frequency of the piezoelectric crystal circuit 4 control the motor control unit 37 for controlling the phase of the control current supplied over circuit 39 to Kollsman two phase 400 cycle drag cup motor 31, thereby automatically adjusting the effective frequency of the radiofrequency power unit which is supplied over line circuit 42 to coupling coil 1. The piston 16 is adjusted manually through the micrometer screw adjustment 15 from hand control 17 for selecting a fixed path for the vibrations through the space through the piezoelectric crystal 8 and piston 16 in the gas filled chamber 11. The relative position of pointer 15a over calibrations 51 on scale 52 provide a direct reading of the distance of piston 16 from piezoelectric crystal 8. Frequency is measured by direct readings of the scale 44a calibrated in terms of frequency and adjusted relative to reference mark 44b for maximum readings of current $I_g$ on galvanometer 7.

It will be understood that motor 31 is controlled at a rapid rate to hunt about a maximum to either control the spacial relation of piston 16 with respect to piezoelectric crystal 8 in one instance, or to control the frequency supplied to the piezoelectric crystal 4 from the radiofrequency power unit in the other instance.

Fig. 6 shows the "$I_g$-distance" curve enlarged and the curve applied to the "hunting" system of determining the peak. It also shows how the instrument can be used to indicate differential changes in the variable under consideration. The abscissa represents distance or frequency whereas the ordinates represent the current through the piezoelectric crystal 4. The peak of curve 18 has been enlarged to show the comparison with the next adjustment peak of the curve at 19 and the path 49 of the "$I_g$-distance" as the motor 31 hunts about maximum $I_g$ if the motor reverses each time $I_g$ falls to the limit represented at 50. The value of $I_{g_0}$ is adjusted to indicate $\pm \Delta I_g$ as $f(\pm \Delta P_0)$. Reference to the pressures within the chamber 11 have been indicated on the abscissa as $P_0$ and $P_0 - \Delta P_0$ and $P_0 + \Delta P_0$.

Thus hunting path 49 successively reverses its direction according to the differential operation of the supersonic interferometer.

The operation of the electro-mechanical system shown in Figs. 4 and 5 is based on the hunting of the circuit about a predetermined peak of the curve at 18, for example. The motor driving circuit is so arranged that it reverses the motor 31 every time $I_g$ decreases. Therefore, if the system is once adjusted to be at a peak in $I_g$, the motor 31 will run back and forward with every change in $I_g$ and continue to "hunt" about the position of maximum $I_g$. The electronic system for discovering changes in $I_g$ is of the "intermittent remembering" kind operating a two position trigger circuit.

Another method of carrying out my invention involves the use of a divided crystal and slightly different path lengths. This system is more complicated but has the advantage of sensing direction as well as magnitude.

The "differential" aspect of the instrument requires the coarse adjustment to be in the middle of the side of the characteristic curve. Very small changes in one variable make large changes in the current which can be simply related to the changes in the variable because the characteristic curve is nearly a straight vertical line.

While I have described my invention in certain of its preferred embodiments, I desire that it be understood that certain modifications may be made and that no limitations be placed upon my invention other than may be imposed by the scope of the appended claims.

What I claim and desire to secure by Letters Patent of the United States is as follows:

1. In a supersonic interferometer system, a fluid filled chamber, a piezoelectric crystal device supported in said chamber for propagating vibrations through the fluid filled chamber, an adjustable reflecting surface in said fluid filled chamber for adjusting the effective length of the path of vibrations generated by the piezoelectric crystal device, means for indicating the adjustment of said reflecting surface an oscillation circuit connected with the piezoelectric crystal device for normally sustaining oscillations through the piezoelectric crystal device, means for impressing high frequency energy upon the piezoelectrically sustained oscillations, means in said circuit for detecting changes in condition of the sustained oscillations according to changes in condition of the fluid path in the fluid filled chamber and means controlled by said last mentioned means for controlling the position of said adjustable reflecting surface.

2. In a supersonic interferometer, a fluid filled chamber, a piezoelectric crystal device for generating and propagating supersonic waves within the fluid filled chamber, selectively adjustable means for reflecting the propagated supersonic waves, means for indicating the adjustment of said last mentioned means, means for introducing variable conditions in the region within the fluid filled chamber between the piezoelectric crystal device and the adjustable means for reflecting the propagated supersonic waves, a tuned circuit connected with said piezoelectric crystal device, means for impressing high frequency oscillations on said tuned circuit, means for detecting the condition of resonance or departure from resonance in proportion to the effects of the variable conditions upon the vibrations in the fluid filled chamber and means controlled by said last named means for operating said adjustable means.

3. In a supersonic interferometer, a fluid filled chamber, a piezoelectric crystal device for generating and propagating supersonic waves within the fluid filled chamber, adjustable means for reflecting the propagated supersonic waves, means for indicating the adjustment of said last mentioned means, means for introducing variable conditions in the region within the fluid filled chamber between the piezoelectric crystal device and the adjustable means for reflecting the propagated supersonic waves, a tuned circuit connected with said piezoelectric crystal device, means for impressing high frequency oscillations on said tuned circuit and means controlled by the characteristic changes in said tuned circuit for operating said adjustable means and selectively fixing the effective length of the path of vibrations in the fluid filled chamber for compensating for the effects introduced into said path by the variable conditions to which said fluid filled chamber is subjected.

RICHARD K. BLACKBURN.

REFERENCES CITED

The following references are of record in the file of this patent:

UNITED STATES PATENTS

| Number | Name | Date |
|---|---|---|
| 1,789,369 | Meissner | Jan. 20, 1931 |
| 1,858,931 | Langevin et al. | May 17, 1932 |
| 2,099,687 | Hartig | Nov. 25, 1937 |
| 2,280,226 | Firestone | Apr. 21, 1942 |
| 2,283,750 | Mikselson | May 19, 1942 |
| 2,315,756 | Warner | Apr. 6, 1943 |
| 2,378,226 | Lee | June 12, 1945 |

FOREIGN PATENTS

| Number | Country | Date |
|---|---|---|
| 278,316 | Germany | Sep. 25, 1914 |

OTHER REFERENCES

Pielemeier, "Physical Review," Oct. 15, 1929, vol. 34, pp. 1184–1203.